(12) United States Patent
Steinmann

(10) Patent No.: US 11,800,225 B2
(45) Date of Patent: Oct. 24, 2023

(54) CAMERA BODY WITH MECHANICAL FMC STABILIZATION FOR AN AIRBORNE OR SPACEBORNE SURVEYING DEVICE

(71) Applicant: LEICA GEOSYSTEMS AG, Heerbrugg (CH)

(72) Inventor: Patrick Steinmann, Oberuzwil (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 328 days.

(21) Appl. No.: 17/334,760

(22) Filed: May 30, 2021

(65) Prior Publication Data

US 2022/0053135 A1 Feb. 17, 2022

(30) Foreign Application Priority Data

May 29, 2020 (EP) ...................................... 20177489

(51) Int. Cl.
*H04N 23/68* (2023.01)
*H04N 7/18* (2006.01)
*H04N 23/54* (2023.01)

(52) U.S. Cl.
CPC ............. *H04N 23/687* (2023.01); *H04N 7/18* (2013.01); *H04N 23/54* (2023.01)

(58) Field of Classification Search
CPC ......... H04N 23/687; H04N 23/54; H04N 7/18
USPC .......................................................... 348/144
See application file for complete search history.

(56) References Cited

U.S. PATENT DOCUMENTS

| 8,548,313 | B2 | 10/2013 | Krueker | |
|---|---|---|---|---|
| 10,893,200 | B2* | 1/2021 | Ba-Tis | ................... G03B 13/36 |
| 11,378,398 | B2 | 7/2022 | Hornung | |
| 2009/0309982 | A1* | 12/2009 | Rouvinen | .......... H04N 23/6812 |
| | | | | 348/E5.046 |
| 2010/0079101 | A1* | 4/2010 | Sidman | ................ F16M 11/041 |
| | | | | 224/272 |
| 2011/0217029 | A1* | 9/2011 | Wu | ....................... G02B 27/646 |
| | | | | 396/55 |

(Continued)

FOREIGN PATENT DOCUMENTS

| CN | 110850429 A | 2/2020 |
|---|---|---|
| EP | 1 570 314 B1 | 9/2005 |

OTHER PUBLICATIONS

European Search Report dated Jan. 21, 2021 as received in U.S. Appl. No. 20/177,489.

*Primary Examiner* — Matthew David Kim
(74) *Attorney, Agent, or Firm* — Maschoff Brennan

(57) ABSTRACT

The invention relates to a camera body comprising an optics interface configured for receiving projection optics, a holder coupled with the optics interface, a sensor arranged on the holder and configured for being movable relative to the optics interface along a stabilisation axis, circuitry connected to the sensor and configured for generating surveying data, the holder comprising a first frame and a first movable part that is connected to the first frame via a first solid-state joint, the sensor arranged on the first movable part, the first solid-state joint configured for providing a movability of the first movable part relative to the first frame along the stabilisation axis, a motor having a mover and a stator, the motor connected to the circuitry, the mover operatively linked with the first movable part, and the stator fixedly arranged relative to the first frame.

13 Claims, 4 Drawing Sheets

(56) References Cited

U.S. PATENT DOCUMENTS

| | | | |
|---|---|---|---|
| 2012/0082441 A1* | 4/2012 | Krueger | H04N 23/51 |
| | | | 396/7 |
| 2018/0079529 A1* | 3/2018 | Saika | F16M 13/02 |
| 2018/0171991 A1* | 6/2018 | Miller | F03G 7/0614 |
| 2018/0346148 A1* | 12/2018 | Zhang | B64C 39/024 |
| 2019/0174036 A1* | 6/2019 | Okutani | H04N 23/54 |
| 2019/0379268 A1* | 12/2019 | Adams | B64D 47/08 |

* cited by examiner

CAMERA BODY WITH MECHANICAL FMC STABILIZATION FOR AN AIRBORNE OR SPACEBORNE SURVEYING DEVICE

FIELD OF THE INVENTION

The present invention relates to a camera body with mechanical FMC stabilization for an airborne or spaceborne surveying device and to such a surveying device itself.

BACKGROUND OF THE INVENTION

EP 1 570 314 B1 is showing an exemplary camera module according to the art and a flying apparatus with such camera module. These kind of cameras are used to survey swathes of land by capturing photos of the earth surface underneath the aircraft. Due to small GSD (ground sampling distance), high flying speeds, the requirement to also survey at low light conditions and resulting relatively high exposure times, such cameras need an appropriate image stabilization, which is usually called forward motion compensation (FMC) in the art. With a stabilisation speed, which is a function of the current flight speed and the GSD, the camera or part thereof is, during the exposure time, moved essentially parallel to the flight direction in order to provide image data without forward motion blur. Typically, these kind of camera systems are operated with a gyro stabilized mount, to compensate for aircraft drift angles, and blur caused by aircraft vibrations and angular motion.

However, a downside of available mechanical solutions is a large construction of the involved FMC components, resulting in a large camera body size, which limits the usage in a size constrained application. Software solutions are not as performant and/or are extremely computation intensive.

OBJECT OF THE INVENTION

Therefore, the invention provides an improved camera body and surveying device with a more compact design and lower mass inertia. A camera body and surveying device according to the invention allows for a reduced number of involved components, a lighter and smaller construction, and faster reaction times. In other words, the present invention provides a compact camera body with a mechanical FMC to allow compact integration in a multi-camera hybrid system.

SUMMARY OF THE INVENTION

The invention relates to a camera body for an airborne or spaceborne surveying device adapted to be mounted on an aircraft or satellite and to survey the earth surface, the camera body comprising an optics interface configured for receiving projection optics, a holder coupled with the optics interface, a sensor arranged on the holder and configured for being movable relative to the optics interface along a stabilisation axis, the stabilisation axis to be aligned with a movement direction of the aircraft or satellite relative to the earth surface, circuitry connected to the sensor and configured for generating surveying data, the holder comprising a first frame and a first movable part that is connected to the first frame via a first solid-state joint, the sensor arranged on the first movable part, the first solid-state joint configured for providing a movability of the first movable part relative to the first frame along the stabilisation axis, a motor having a mover and a stator, the motor connected to the circuitry, the mover operatively linked with the first movable part, and the stator fixedly arranged relative to the first frame.

In embodiments, the mover is a rotor and the camera body further comprises an eccentric element connected to the rotor, the rotor is operatively linked with the first movable part via the eccentric element the motor is configured for rotating the eccentric element, and the circuitry is configured for moving the sensor along the stabilisation axis by controlling the motor.

In embodiments, the eccentric element, the motor, and the circuitry are configured in such a way that the first movable part is movable forth and back along the stabilisation axis by at least ±50 µm. This range is typical and translates to about +−10 pixels, depending on the sensor technology.

In embodiments, the first movable part comprises a second frame and a second movable part that is connected to the second frame via a second solid-state joint, the sensor fixedly arranged relative to the second frame, the second solid-state joint configured for providing a movability of the second movable part relative to the second frame in a direction perpendicular to the stabilisation axis, and the eccentric element operatively linked with the second movable part.

In embodiments, the first frame surrounds the first movable part.

In embodiments, the circuitry is configured for generating the surveying data by controlling an exposure of the sensor, an exposure time is between 0.5 and 40 ms, in particular between 1 and 20 ms, and the eccentric element, the motor, and the circuitry are configured in such a way that the first movable part is movable, during the exposure time, with a stabilisation speed along the stabilisation axis, the stabilisation speed being at least nearly constant during the exposure time.

In embodiments, the circuitry is configured for determining the stabilisation speed based on (a) a height of the aircraft or satellite above the earth surface, (b) a velocity of the aircraft or satellite relative to the earth surface, the circuitry particularly being configured for receiving the velocity, and (c) a focal length of projection optics received by the optics interface, in particular and an alignment of the camera body relative to the earth surface.

In embodiments, the holder comprises a plate, and the first solid-state joint and/or the second solid-state joint formed by channels incorporated into the plate.

In embodiments, the channels forming at least one elastic zone (22) connecting the respective frame with the respective movable part, and the elastic zone having an elastic deformability significantly higher than the rest of the plate.

In embodiments, the motor is a stepper motor, a brushless DC motor, a linear motor, or a voice coil linear motor.

In embodiments, the camera body comprises an encoder configured for detecting a position of the first movable part relative to the first frame. This position can be used to enhance the geometric precision of the camera, while using the exact position of the FMC device at the exposure time.

In embodiments, the sensor is a CCD image sensor, a CMOS image sensor, a TOF sensor, or a thermal infrared sensor.

The invention further relates to an airborne or spaceborne surveying device adapted to be mounted on an aircraft or a satellite and to survey the earth surface, comprising at least one camera with projection optics and a camera body according to the description herein.

In embodiments, the surveying device comprises a LiDAR module for measuring distances to the earth surface, and the sensor of the at least one camera is a CCD sensor, a CMOS sensor, or an infrared sensor. The LiDAR module itself is to be considered comprising a TOF sensor.

In embodiments, the surveying device comprises six cameras, two cameras are aligned at least nearly towards Nadir, and four cameras are obliquely aligned with respect to Nadir.

Of course, the surveying device can be adapted to have any amount of such cameras according to the invention. As well, the cameras can be provided in any combination of LiDAR camera(s), RGB camera(s), and thermal camera(s). Oblique is to be understood as deviating from Nadir in an angle of between 1° and 45°.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
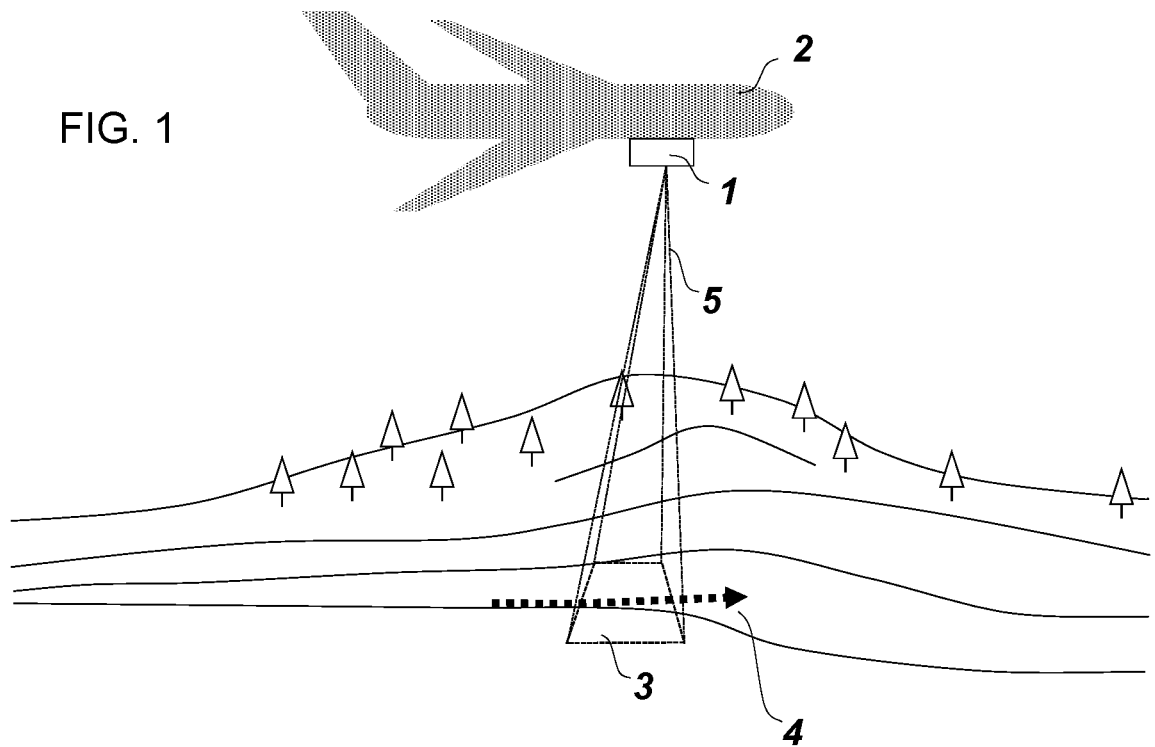
FIG. 1 shows an aircraft surveying a section of the earth surface.

FIG. 1 shows a first exemplary field of use for a camera body according to the invention, which is in an airborne surveying device 1 carried by an aircraft 2 for surveying the earth surface 3 while the aircraft moves along a flight direction 4 relative to the earth surface 3. The surveying device 1 is usually mounted to the outside of the aircraft facing downwards and aligned in a known way relative to the usual flight direction 4. The surveying device 1 comprises at least one camera which comprises a camera body according to the invention. The surveying device 1 can, however, also comprise more than just one camera, in particular two, or six. If the surveying device 1 comprises more than one camera, the several cameras may have different alignments: for example, one or more cameras could face towards Nadir ("straight down"), one or more cameras could point obliquely to a side of forwards or backwards with respect to the flight direction 4.

The camera of surveying device 1 further comprises a telephoto lens (projection optics) in order to enlarge depiction of the earth surface 3 and provide the field of view 5. Due to relatively long exposure times, the long focal distance, and the high speed of the aircraft, the surveying device 1 is reliant on a forward motion compensation (FMC).

The camera body and/or the surveying device according to the invention serves this purpose while allowing for a very compact and stiff construction. Further, the invention provides improvement of the surveying data generation because a high resolution of the sensor (up to 150 Megapixels and more) requires an extremely precise positioning of the FMC.

Figure 2:
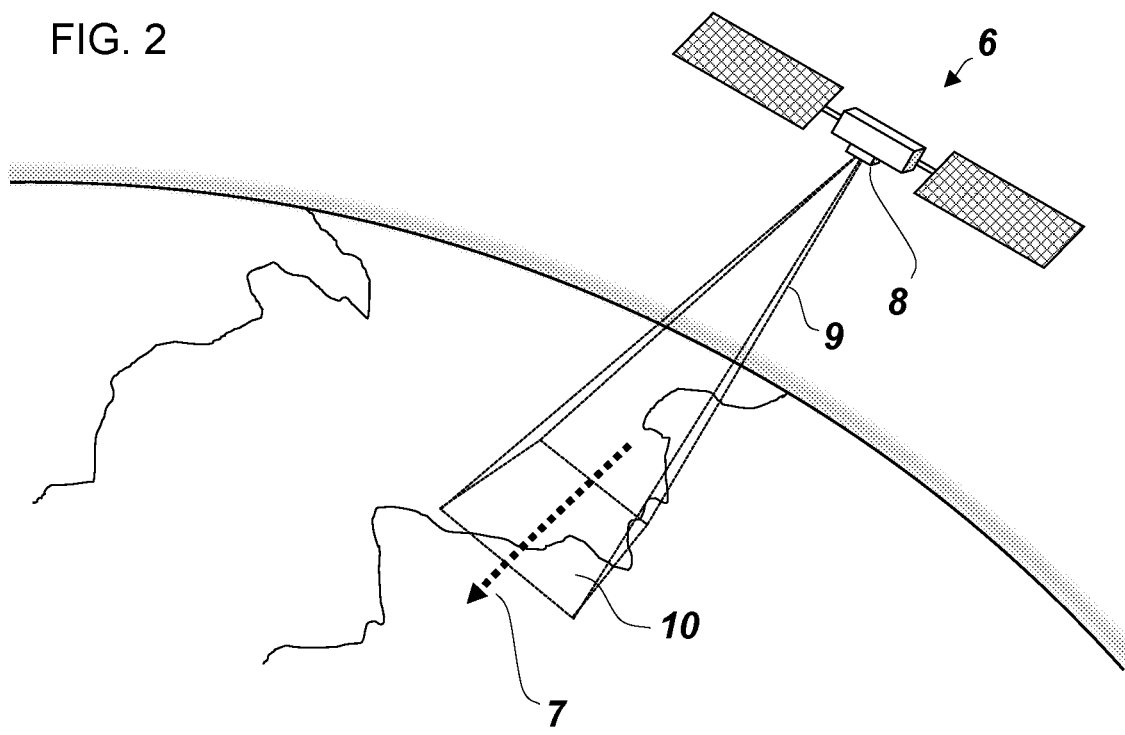
FIG. 2 shows a satellite surveying a section of the earth surface.

A second exemplary field of use is shown in FIG. 2. A satellite 6 in movement relative to the earth in the direction 7 has a spaceborne surveying device 8 with projection optics providing the field of view 9 in order to survey the earth surface 10. A camera body and/or a surveying device according to the invention is also deployable in this spaceborne surveying device 8 providing an FMC with all the advantageous construction aspects as described herein.

Figure 3:
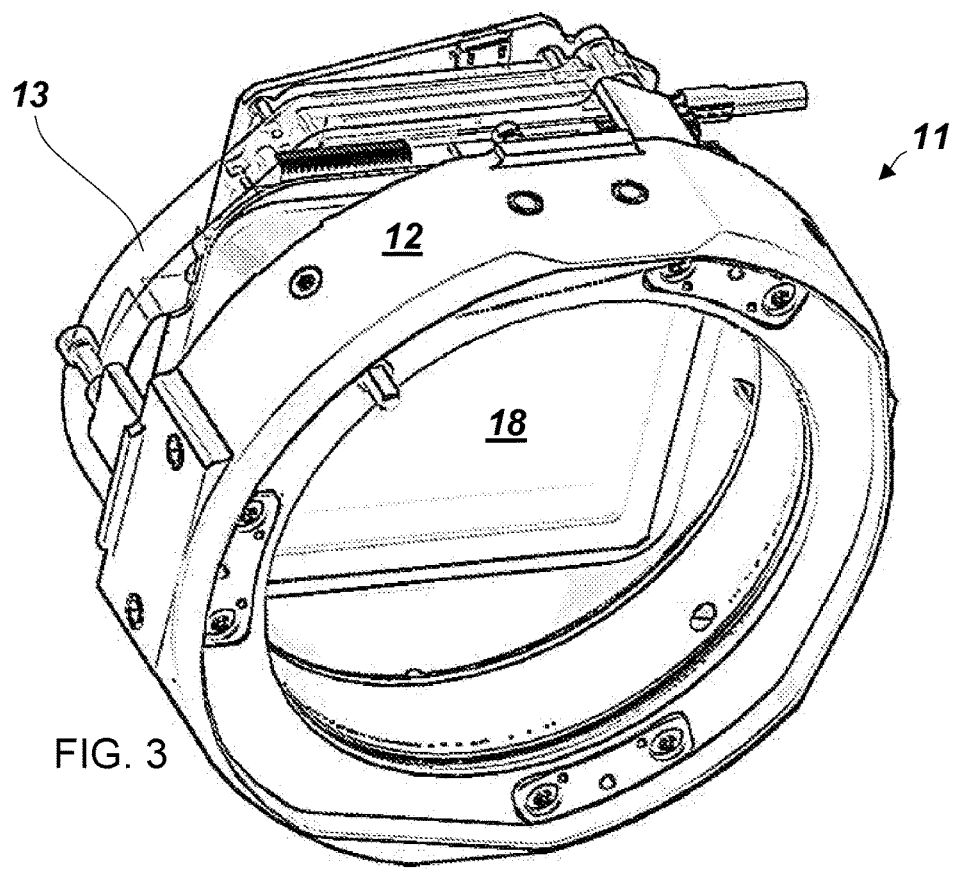
FIG. 3-7 show an embodiment of a camera body according to the invention from different perspectives.

FIG. 3 shows an embodiment of a camera body 11 according to the invention. The camera body 11 has an optics interface 12 and a holder 13. In particular, a projection optics can be screwed onto the optics interface or the optics interface may be embodied as a bayonet. The optics interface 12 may have protruding elements (like the pin in the figure) for aligning projection optics to be attached. A sensor 18 is arranged on the holder 13 to receive light projected by projection optics. The sensor can be soldered onto the circuitry, in particular wherein the circuitry is soldered onto the first movable part.

Figure 4:
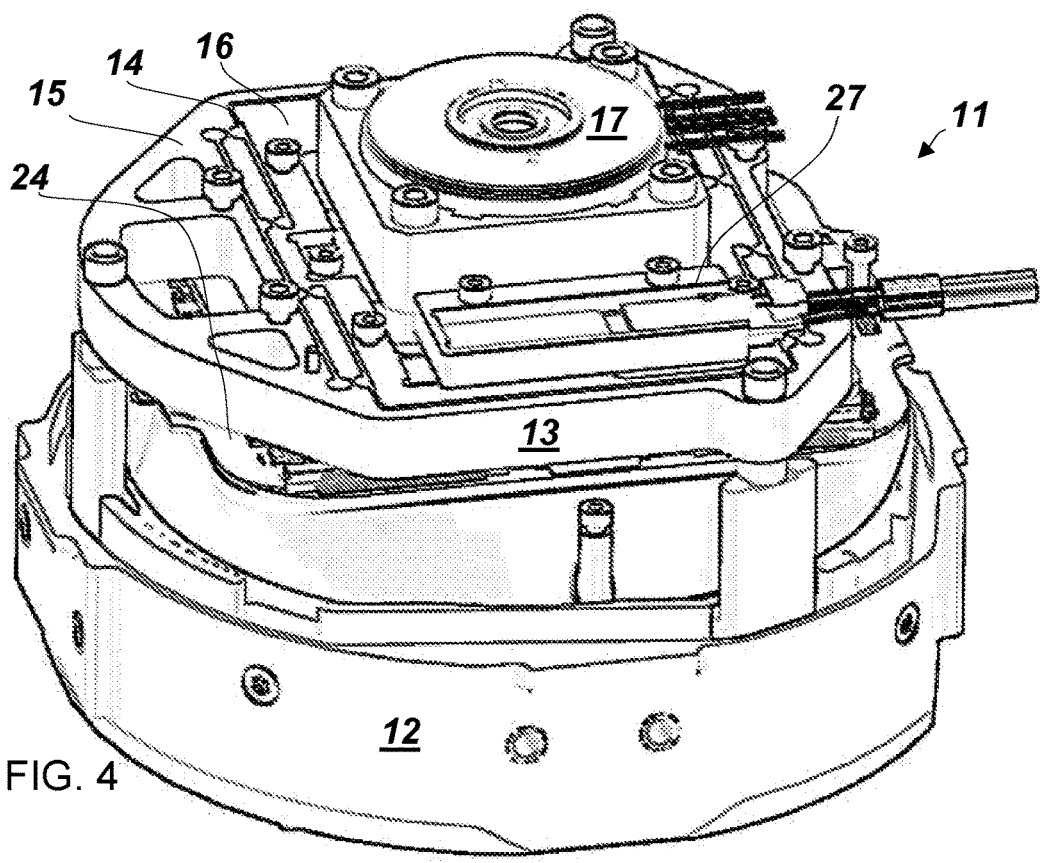

FIG. 4 shows the other side of the camera body 11. The holder 13 comprises a first frame 15 and a first movable part 16 that is made movable relative to the first frame 15 by a first solid-state joint 14. The joint 14 is particularly machined in the holder 13, dividing the frame 15 from the first movable part 16. A motor 17 is arranged above the first movable part 16 but fixedly relative to the frame 15. An optional encoder 27 is also arranged above the first movable part 16 but fixedly relative to the frame 15 in order to observe the current position of the first movable part 16. Circuitry 24 responsible to record and/or process the signals arriving at the sensor 18 are in this embodiment located between the first movable part 16 and the sensor 18.

Figure 5:
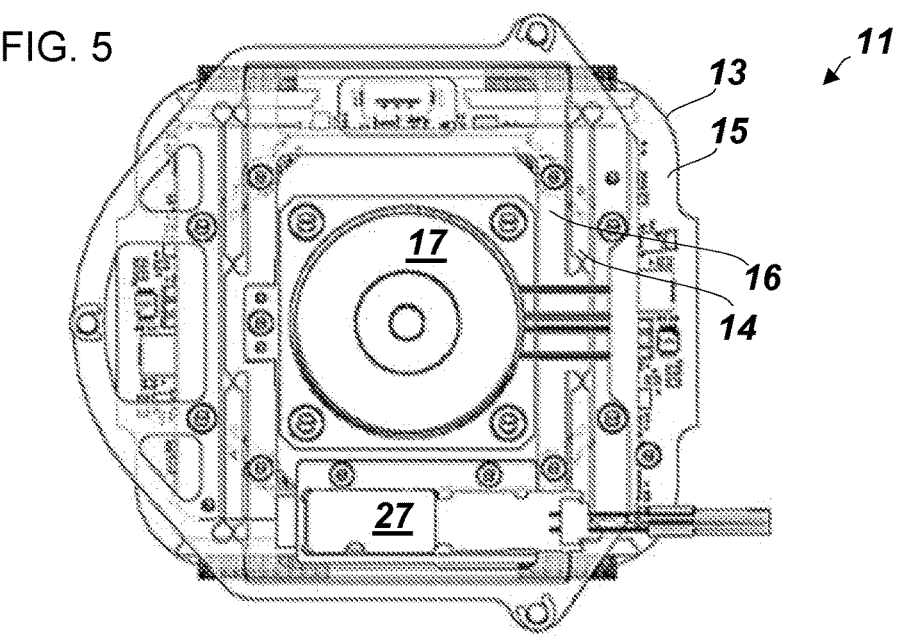

FIG. 5 shows a top view of the camera body 11. The motor 17 in the shown embodiments is a rotary motor, thus having a rotor as mover and a stator. However, in other embodiments, the motor can be also a motor generating a linear movement of a mover.

Figure 6:
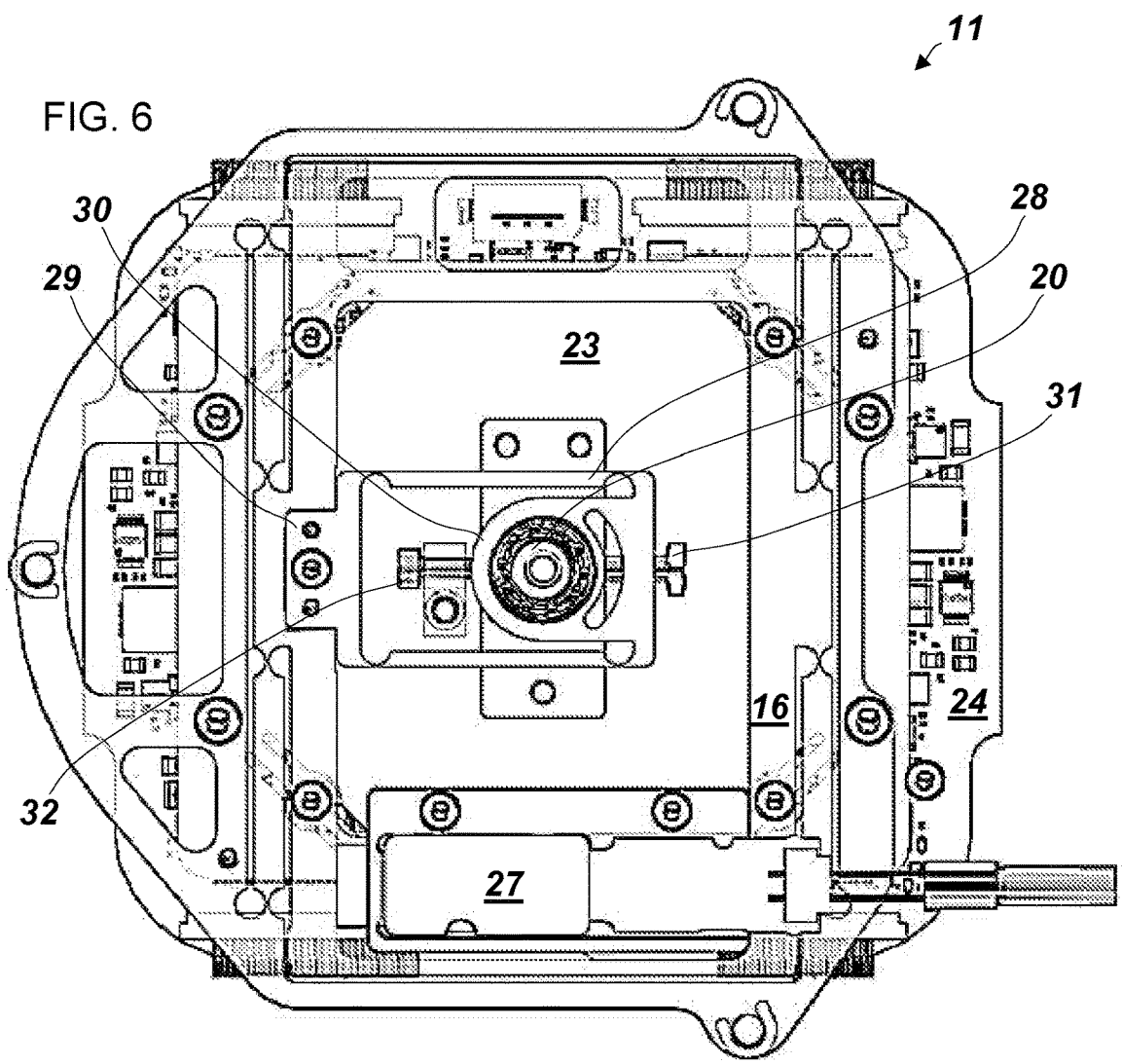

FIG. 6 shows the camera body 11 of FIG. 5 with the motor 17 removed to reveal an optional second solid-state joint 28 which allows a movability of a second movable part 30 relative to a second frame 29. An eccentric element 20 is coupled to the motor 17 via a rotor pin 19, which can be seen in FIG. 7. The eccentric element 20 is rotatably mounted in the second movable part 30. Due to the design of the second solid-state joint 28 and fixations by a first screw 31 and a second screw 32. The first screw 31 stops the second movable part 30 against the first movable part, and the second screw 32 stops the lower part of the rotor pin 19, or a non-eccentric element on the pin, against the first frame 15 or the motor 17 (or any other stationary element). The second movable part 30 can thus only move relative to the first movable part perpendicular to the stabilisation axis (horizontal in FIG. 6). That is, in view of FIG. 6, the eccentric element 20 can evade via the second movable part 30 up and down (vertically), such that only the horizontal components of the rotation of the eccentric element 20 is affecting a movement of the first movable part 16 along the stabilisation axis.

Figure 7:
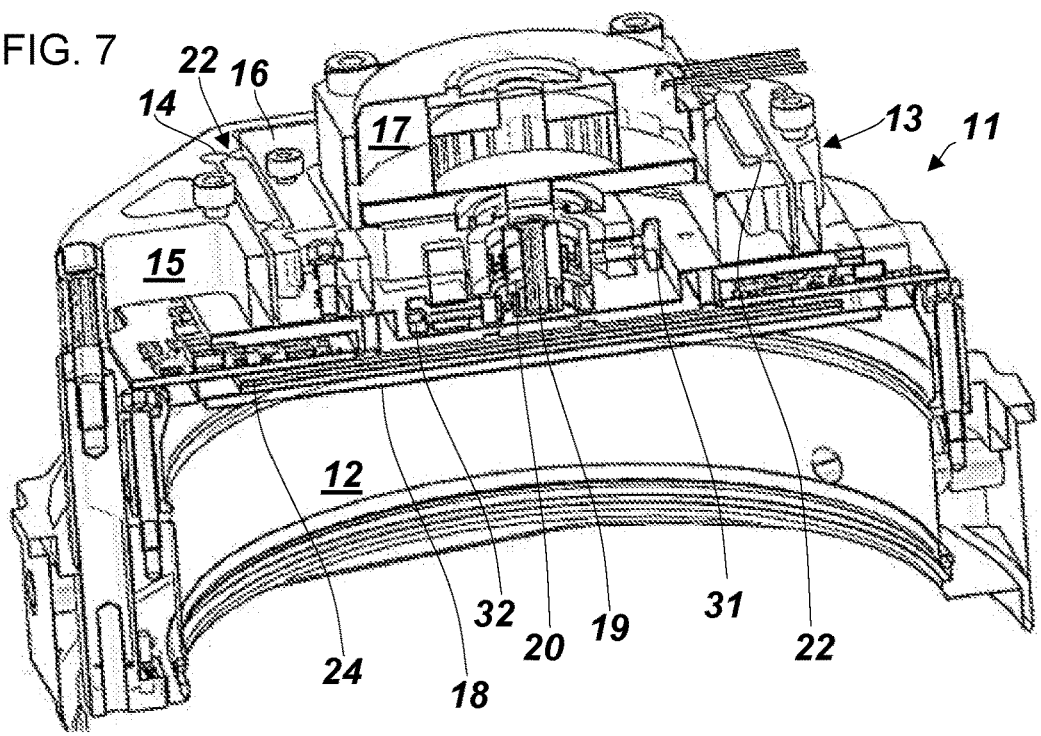

FIG. 7 shows a sectional view of the camera body 11, again showing the solid-state joint 14, which, in this embodiment, is formed by channels processed into the holder 13, thereby dividing the first frame 15 from the first movable part 16. In particular, the channels form elastic zones 22 connecting the first frame 15 with the first movable part 16, wherein the elastic zones 22 have an elastic deformability significantly higher than the frame or the first movable part. The movability of the first movable part 16 is given along a stabilisation axis due to the design of the first solid-state joint 14. In a particular embodiment, the holder is formed by a plate, in particular a metal plate, wherein the channels are going through the whole thickness of the plate. The second solid-state joint 28 is produced following the same principle.

The shown configuration with two solid-state joints has the extra advantage that the system is even stiffer and more robust against incorrect positioning of the sensor due to vibrations or shocks, especially when the motor is not activated. However, to carry out the invention, the second solid-state joint is not necessarily required as well as the drive containing the eccentric element. The first solid-state joint 14 is designed such that only or essentially only the straight movement along the stabilisation axis is allowed. The second solid-state joint 18 can be provided to compensate for the lateral movements of the eccentric element 20. In particular, the first movable part 16 has a recess 23 wherein the motor or the rotor or the elements attached to the rotor is at least in part incorporated in the recess.

The circuitry can comprise not only the part 24 but also at least one further component, which is e.g. external to the camera body. The term circuitry as used herein can be understood in at least some embodiments as a computing system which can comprise one or more components. The circuitry 24 is connected to the sensor 18 so as to generate, and optionally also (pre-)process in particular with further circuitry external to the camera body, the surveying data. Since the sensor 18 can be an image sensor, such as CCD or CMOS sensor, a TOF sensor, or an infrared sensor, the surveying data can accordingly be b/w or colour images, reception pulses in particular with time stamp and/or the wave form, or thermal images. If the sensor is a TOF sensor, a surveying device according to the invention also comprises an emitter to send out the pulses of which the reflections are received by the TOF sensor, and in particular a clock to produce respective time stamps (of transmittal and arrival).

The circuitry (the element 24 or some other element belonging to the circuitry) is connected to the motor, and in particular configured for positioning the sensor along the stabilisation axis by controlling the motor. More specifically, in the shown embodiment, the eccentric element, the motor, and the circuitry are configured in such a way that the first movable part is movable forth and back along the stabilisation axis by at least ±50 µm. The motion must be extremely smooth and precise, to support sensor pixel sizes in the range of down to about 3 µm. The circuitry is, in embodiments, configured for generating the surveying data by controlling an exposure of the sensor, wherein an exposure time is between 0.5 and 40 ms, in particular between 1 and 20 ms, and wherein the eccentric element, the motor, and the circuitry are configured in such a way that the first movable part is movable with a stabilisation speed during the exposure time in a direction parallel to the flight direction. The stabilisation speed can be dimensioned by the circuitry based on a height of the aircraft or satellite above the earth surface, a velocity of the aircraft or satellite relative to the earth surface, and a focal length of projection optics received by the optics interface, in particular wherein the circuitry is configured for receiving the velocity, i.e. a value thereof. The sensor may be soldered onto the circuitry, in particular wherein the circuitry itself can also be soldered onto the first movable part.

The movement of the first movable part is following the movement of the eccentric element 20 in the directional component along the stabilisation axis. Due to the rotation, this movement follows a sine which means that at the reversal points there is a standstill towards which the movement of the first movable part is slowing down and from which it is accelerating again. These decelerating/accelerating areas are surrounding a range in which the first movable part is moving with a speed that is almost constant. When the first movable part 16, and with it the sensor 18, is moving in that range of almost constant speed, this piece of the movement (stabilisation speed) can be used for the FMC. There can either be a predetermined correlation between the current position of the rotor 19 and the current position of the first movable part, or the camera body or surveying device according to the invention may additionally comprise a positional encoder 27 for detecting a current position of the first movable part 16.

In any case, the circuitry 24 is configured to control the sensor 18 to sample the light from the earth surface during the above described range where the first moveable part 16 is travelling with the stabilisation speed, which is nearly constant. During the exposure time, the sensor is moving with this speed and avoids blur in the surveying data. The sensor 18 can in some embodiments also comprise a shutter, wherein for controlling the exposure of the sensor, the shutter can be controlled by the circuitry.

The invention allows for an extraordinarily compact construction and in particular in a very stiff one. The motor 17 can be chosen to be a flat motor that is particularly (at least in part) embedded into the FMC on the other (with respect to the sensor 18) side of the holder 13. The construction has, compared to generic devices known from prior art, an increased stability, stiffness and precision. This space-saving design is especially desirable when an airborne or spaceborne surveying device comprises more than one camera, in particular six cameras and/or further comprising a LiDAR system.

Figure 8:
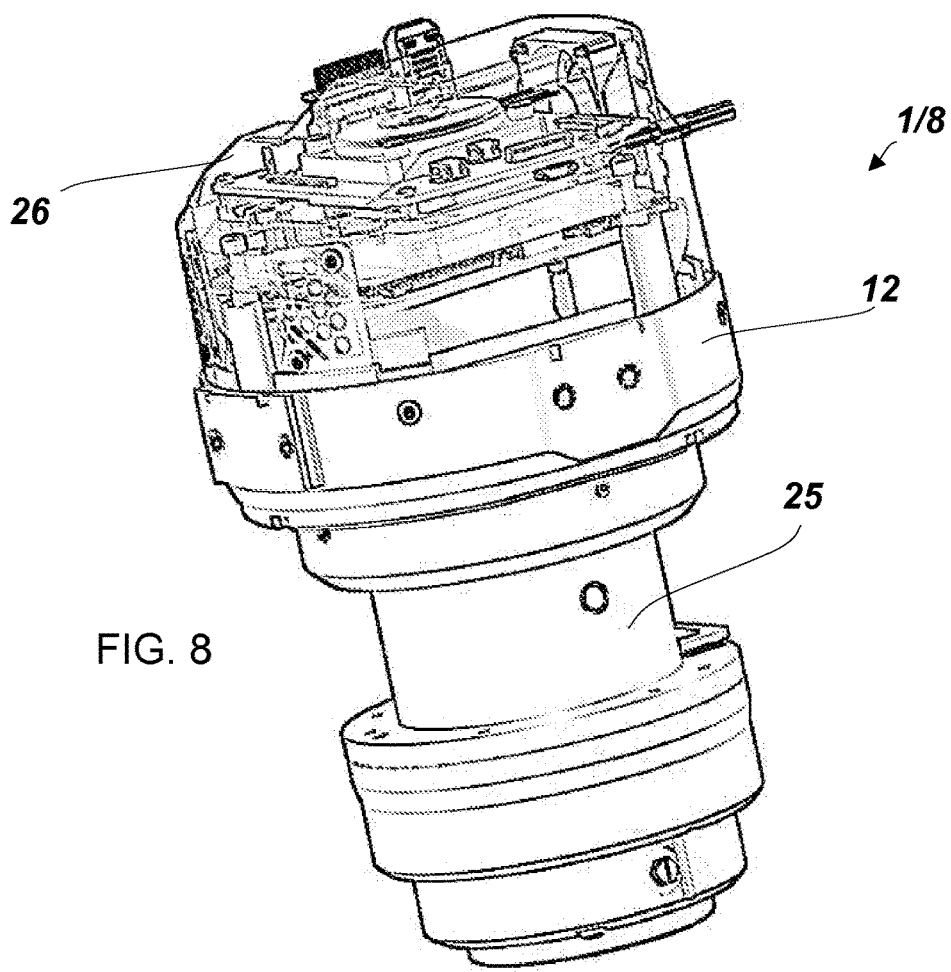
FIG. 8 shows a camera with projection optics and an embodiment of a camera body according to the invention; such a camera can be used in an airborne or spaceborne surveying device according to the invention.

A camera comprises a camera body and projection optics. FIG. 8 shows an embodiment of such a camera of a surveying device according to the invention. A total list of the references used in all figures is provided below:

Key:
1—Airborne surveying device
2—Aircraft
3—Earth surface
4—Flight direction of the aircraft
5—Field of view of the airborne surveying device
6—Satellite
7—Movement direction of the satellite relative to the earth
8—Spaceborne surveying device
9—Field of view of the spaceborne surveying device
10—Earth surface
11—Camera body
12—Optics interface
13—Holder
14—First solid-state joint
15—First frame
16—First movable part
17—Motor
18—Sensor
19—Rotor pin
20—Eccentric element
21—Eccentricity
22—Elastic zone
23—Recess
24—Circuitry
25—Projection optics
26—Cover for the holder (and motor etc.)
27—Encoder
28—Second solid-state joint
29—Second frame
30—Second movable part
31—First screw
32—Second screw Although the invention is illustrated above, partly with reference to some preferred embodiments, it must be understood that numerous modifications and combinations of different features of the embodiments can be made. All of these modifications lie within the scope of the appended claims.

The invention claimed is:

1. A camera body for an airborne or spaceborne surveying device adapted to be mounted on an aircraft or satellite and to survey the earth surface, the camera body comprising
an optics interface configured for receiving projection optics,
a holder coupled with the optics interface,
a sensor arranged on the holder and configured for being movable relative to the optics interface along a stabilisation axis, the stabilisation axis to be aligned with a movement direction of the aircraft or satellite relative to the earth surface,
circuitry connected to the sensor and configured for generating surveying data, comprising
the holder comprising a first frame and a first movable part that is connected to the first frame via a first solid-state joint, the sensor arranged on the first movable part, the first solid-state joint configured for providing a movability of the first movable part relative to the first frame along the stabilisation axis,
a motor having a mover and a stator, the motor connected to the circuitry, the mover operatively linked with the first movable part, and the stator fixedly arranged relative to the first frame,
the mover being a rotor, the camera body further comprising an eccentric element connected to the rotor, the rotor operatively linked with the first movable part via the eccentric element, the motor configured for rotating the eccentric element, and the circuitry configured for moving the sensor along the stabilisation axis by controlling the motor, and
the first movable part comprising a second frame and a second movable part that is connected to the second frame via a second solid-state joint, the sensor fixedly arranged relative to the second frame, the second solid-state joint configured for providing a movability of the second movable part relative to the second frame in a direction perpendicular to the stabilisation axis, and the eccentric element operatively linked with the second movable part.

2. The camera body according to claim 1,
the eccentric element, the motor, and the circuitry being configured in such a way that the first movable part is movable forth and back along the stabilisation axis by at least ±50 μm.

3. The camera body according to claim 1, the first frame surrounding the first movable part.

4. The camera body according to claim 1, the circuitry configured for generating the surveying data by controlling an exposure of the sensor, an exposure time being between 0.5 and 40 ms, in particular between 1 and 20 ms, and the eccentric element, the motor, and the circuitry configured in such a way that the first movable part is movable, during the exposure time, with a stabilisation speed along the stabilisation axis, the stabilisation speed being at least nearly constant during the exposure time.

5. The camera body according to claim 4, the circuitry is configured for determining the stabilisation speed based on
a height of the aircraft or satellite above the earth surface,
a velocity of the aircraft or satellite relative to the earth surface, the circuitry particularly being configured for receiving the velocity, and
a focal length of projection optics received by the optics interface,
in particular and an alignment of the camera body relative to the earth surface.

6. The camera body according to claim 1, the holder comprising a plate, and the first solid-state joint and/or the second solid-state joint formed by channels incorporated into the plate.

7. The camera body according to claim 6, the channels forming at least one elastic zone connecting the respective frame with the respective movable part, and the elastic zone having an elastic deformability significantly higher than the rest of the plate.

8. The camera body according to claim 1, the motor being a stepper motor, a brushless DC motor, a linear motor, or a voice coil linear motor.

9. The camera body according to claim 1, comprising an encoder configured for detecting a position of the first movable part relative to the first frame.

10. The camera body according to claim 1, the sensor being a CCD image sensor, a CMOS image sensor, a TOF sensor, or a thermal infrared sensor.

11. An airborne or spaceborne surveying device adapted to be mounted on an aircraft or a satellite and to survey the earth surface, comprising at least one camera with projection optics and a camera body according to claim 1.

12. The surveying device according to claim 11, comprising a LiDAR module for measuring distances to the earth surface, the sensor of the at least one camera being a CCD sensor, a CMOS sensor, or an infrared sensor.

13. The surveying device according to claim 11, comprising six cameras, two cameras being aligned at least nearly towards Nadir and four cameras being obliquely aligned with respect to Nadir.

* * * * *